W. P. MEEKER.
PROCESS OF FORMING GLASS TILES.
APPLICATION FILED DEC. 4, 1907.
915,783.
Patented Mar. 23, 1909.
2 SHEETS—SHEET 1.
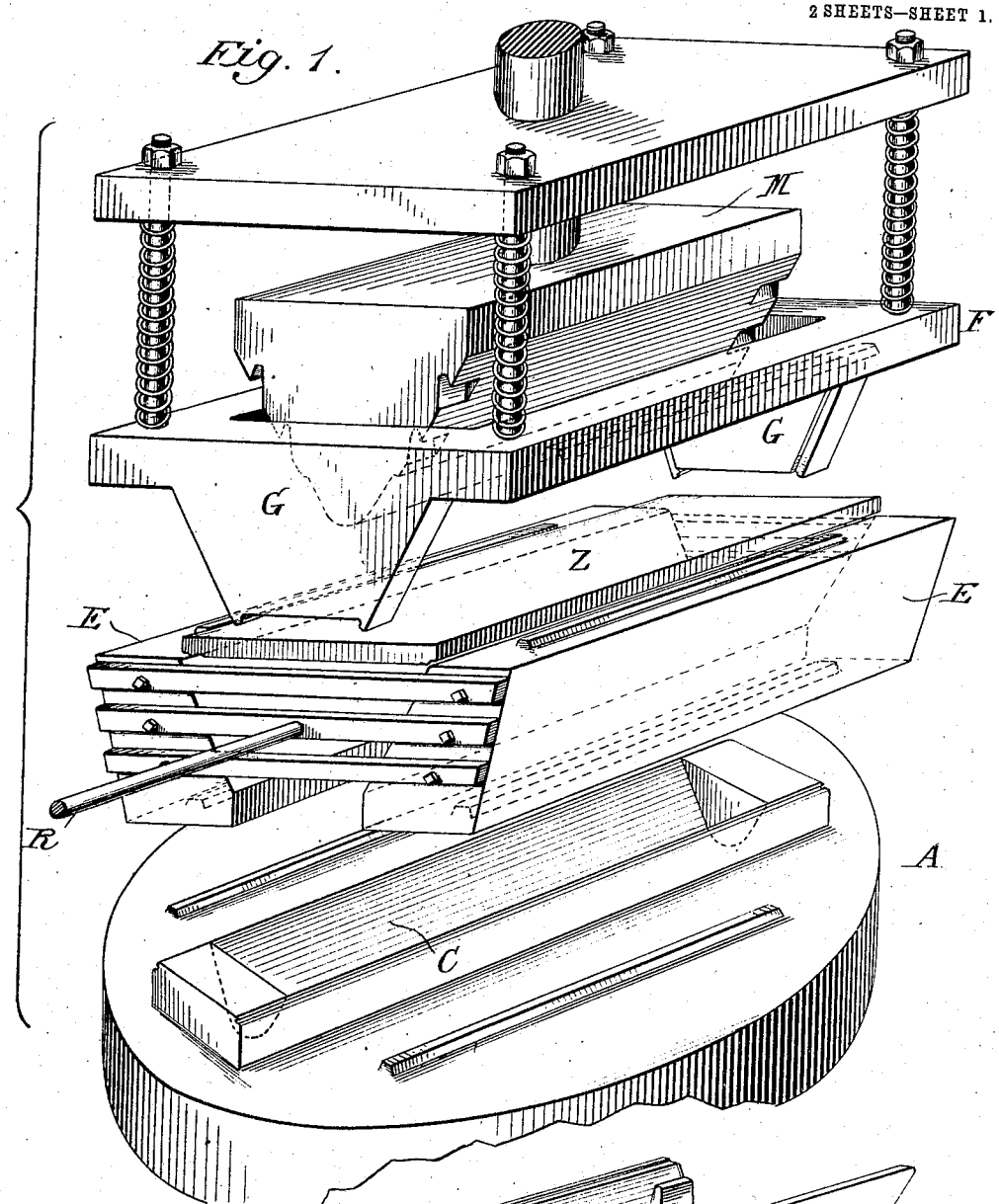
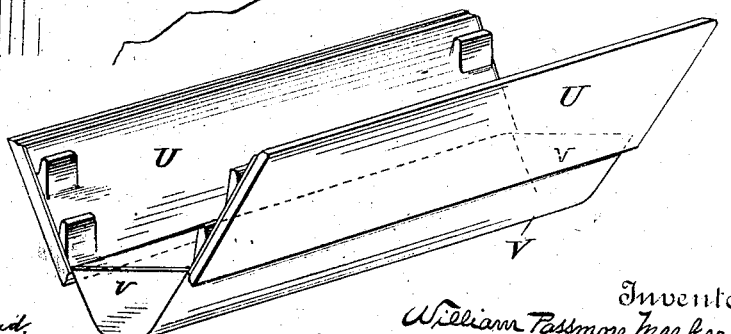

W. P. MEEKER.
PROCESS OF FORMING GLASS TILES.
APPLICATION FILED DEC. 4, 1907.

915,783.

Patented Mar. 23, 1909.
2 SHEETS—SHEET 2.

Witnesses:
Edward C. Rowland.
William H. Mohr.

Inventor
William Passmore Meeker,
By his Attorney
Andrew Wilson.

UNITED STATES PATENT OFFICE.

WILLIAM PASSMORE MEEKER, OF MAPLEWOOD, NEW JERSEY.

PROCESS OF FORMING GLASS TILES.

No. 915,783.　　　　　Specification of Letters Patent.　　Patented March 23, 1909.

Application filed December 4, 1907. Serial No. 405,024.

*To all whom it may concern:*

Be it known that I, WILLIAM PASSMORE MEEKER, a citizen of the United States, residing at Maplewood, Essex county, New Jersey, have invented certain new and useful Improvements in the Process of Forming Glass Tiles, of which the following is a specification.

My invention relates to a process for making melted glass into a form embodying attached sections adapted to form tiles, manipulating this molded form and ultimately separating the sections so that each shall form a completed tile; and my improvements consist in the particulars hereinafter set forth.

In the art of molding glass tiles, in order to secure smooth and unwrinkled tile faces, it is necessary, in the process of molding, to drive the molded glass quickly and firmly into the face forming portion of the mold to hold the molded tile in position until it is hardened, to remove it from the press without bending or breaking it, and to so hold it during the process of annealing that it shall not become warped or distorted. When the tiles are provided with undercut lugs or projections upon their backs this last step becomes a matter of some difficulty because they cannot be laid face up without being liable to warp centrally, and if they are laid face down they are likely to be marred or scratched. Furthermore, if the tile press is worked rapidly the bottom and sides of the press are likely to become so heated that the glass, if allowed to stand in them until it hardens, will adhere thereto, and the molded surfaces will be marred or broken when the tiles are removed from the press; and if the press is worked so slowly as to prevent overheating, the time of the operation is so lengthened as to greatly increase the cost of the operation.

My improved process is directed to steps whereby I successfully accomplish the desired results and avoid the difficulties I have referred to.

In carrying out my process I employ a suitable press, one form of which I have illustrated in the accompanying drawings, in which—

Figure 3:
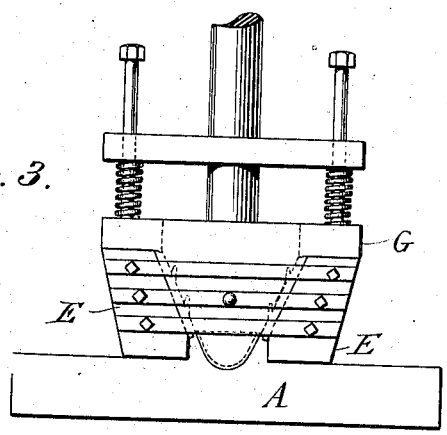
Figure 4:
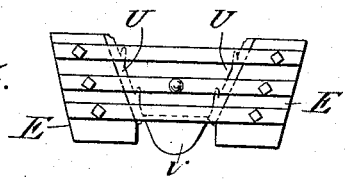
Figure 5:
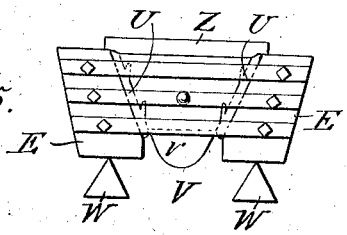
Figure 6:
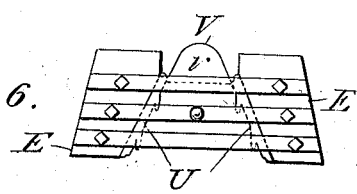
Figure 7:
Figure 8:
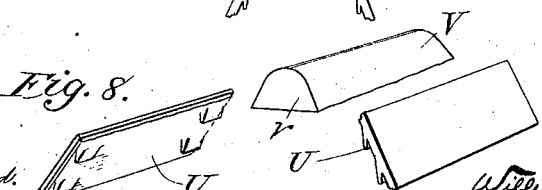

Figure 1 shows a perspective view of the base, sides, former, top and plunger, of the press, and Fig. 2 shows a perspective view of the connected tile sections formed therein. Both ends of these tile sections and connecting web-gutter are alike. Fig. 3 is an end view of the press showing the plunger down and the pressed glass in dotted lines; Fig. 4 is an end view of the sides removed from the press carrying the molded glass with them; Fig. 5 shows the sides resting upon suitable supports and with the former Z resting upon the upper tile-edges; Fig. 6 shows the sides and molded glass turned upside down; Fig. 7 is an end view of the molded glass freed from the press; and Fig. 8 shows in perspective the two tiles separated from their gutter-web.

A quantity of glass is placed in the groove C of the base A, the sides E E are brought down so as to rest upon the base on opposite sides of the gutter, the plunger M and the top F are brought down until the top rests upon and overlaps the inner edges of the sides, and its ends G G close the end spaces between the sides, and the plunger, continuing its descent, strikes the mass of melted glass and forces it quickly up into the spaces between the plunger and the sides of the mold, as shown in Fig. 3, forming the glass into the desired tile sections and leaving a gutter-like web of glass V, provided with ends $v$ $v$, uniting the lower edges of the tile sections U U, it being understood that sufficient space is left between the lower ends of the plunger and the ends of the groove C to allow the glass to form the end-webs $v$ $v$ of the gutter V. The plunger and top are now raised while the glass is still soft and hot so that it will readily separate from their metal surfaces, the depending ends G G of the top being withdrawn from the ends of the tile sections leaving them free from end contact in the mold. The sides E E are next, by means of a suitable handle R, raised free from the bed or base of the press, as shown in Fig. 4, carrying with them the molded form of glass, which, being still soft, comes freely away from the bottom of the mold, and the sides E E, with the molded glass still between them, are then placed upon any suitable supports W W, which will hold them so that the gutter-like web between the tile sections shall be free from contact with the surface below it, (see Fig. 5) and the glass is allowed to partially stiffen. In stiffening, if they are not gripped in position at their upper edges, the tile sections are liable to twist or warp away from the sides, and, to prevent their hardening with such a twist in them, I place over them a suitable former Z, preferably of brass, or I run a suitable stick or other hand tool lengthwise along the edge of the tile sections flattening them down smoothly against the sides, and I then allow the glass to harden. When it has hardened I turn the sides E E upside down as in Fig. 6, so that the molded glass will rest upon its free tile edges with the gutter V uppermost, and I then lift the sides E E off of the glass, from which they readily free themselves, owing to the angle at which they separate from each other and also owing to the fact that in the process, as thus conducted, the sides do not become sufficiently heated to stick to the glass. It will be understood that while one molded portion is hardening and cooling another pair of sides may be put into the press and another tile form pressed up, two or more side sets being thus used in succession with the same bottom, top and plunger. The molded glass, still in one piece, is next annealed in the usual manner, resting, during the process, upon its free tile edges, as in Fig. 7, which are held by the surface below them against distortion, while the upper edges are held by the gutter-web V, which is braced against collapse by its end webs v; and when the annealing process has been completed the gutter web is cut or broken away from the tile sections as in Fig. 8, which will then be ready for use and will be found to be straight and perfect.

Having thus described my invention, what I claim and desire to secure by Letters Patent of the United States, is:—

1. The process of forming glass tiles, consisting in first molding in a press tile sections with temporary, integral web-braces between them, freeing the molded form from the top and bottom portions of the press, allowing the glass to set while in the sides of the press, removing the molded form from the sides, annealing it while resting upon its free tile edges, and lastly separating the tile sections by cutting or breaking away the temporary web sections.

2. The process of forming glass tiles, consisting in first molding a connected plurality of tile sections in a press, freeing the same from the top and bottom portions of the press, allowing the glass to partially harden in the sides of the press, pressing down the edges of the molded form with a hand tool, allowing the glass to set, removing the molded form from the sides by inverting the same, annealing the molded form while resting upon its free tile edges, and lastly separating the tile sections.

3. The process of forming glass tiles, consisting in first molding a plurality of tile sections connected by a suitable web, freeing the same from the top and bottom portions of the press, allowing the glass to partially harden in the sides of the press while the connecting web stands free, pressing down the edges of the molded form with a hand tool, allowing the glass to set, removing the molded form from the sides by inverting the same, annealing the molded form while resting upon its free tile edges, and lastly separating the tile sections.

4. The process of forming glass tiles, consisting in first molding in a press a pair of tile sections laterally connected by a gutter-web with closed ends, freeing the same from the top and bottom portions of the press, allowing the glass to partially harden in the sides of the press, pressing down the edges of the molded form with a hand tool, allowing the glass to set, removing the molded form from the sides by inverting the same, annealing the molded form while resting upon its free tile edges, and lastly separating the tile sections from the gutter web.

5. A new article of manufacture, consisting of a molded form of glass embodying tile portions connected by a temporary web provided with a collapse-resisting member disposed transversely thereof.

6. A new article of manufacture, consisting of a molded form of glass embodying tile portions connected by a temporary laterally curved web provided with a plurality of collapse-resisting members disposed transversely thereof.

7. A new article of manufacture, consisting of a molded form of glass embodying tile portions connected by a grooved web member provided with a plurality of collapse-resisting members disposed transversely thereof.

WILLIAM PASSMORE MEEKER.

Witnesses:
WM. D. NEILLEY,
WILLAM H. MOHR.